Dec. 19, 1933.  P. A. MYERS  1,939,861
POWER HEAD
Original Filed Aug. 19, 1929  4 Sheets-Sheet 1

INVENTOR
PHILIP A. MYERS.
BY Toulmin + Toulmin
ATTORNEY

Dec. 19, 1933.  P. A. MYERS  1,939,861
POWER HEAD
Original Filed Aug. 19, 1929   4 Sheets-Sheet 3

INVENTOR
PHILIP A. MYERS.
BY Toulmin & Toulmin
ATTORNEY

Dec. 19, 1933.   P. A. MYERS   1,939,861
POWER HEAD
Original Filed Aug. 19, 1929   4 Sheets-Sheet 4
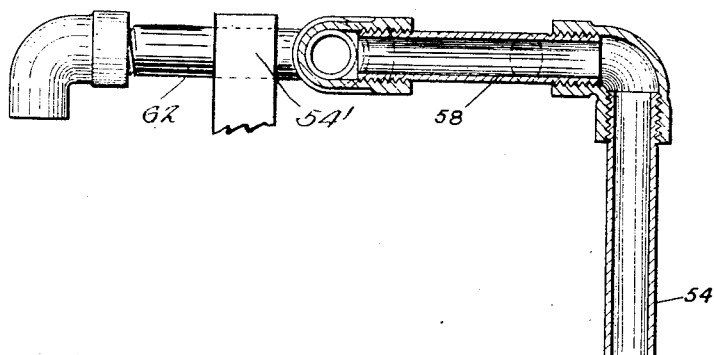
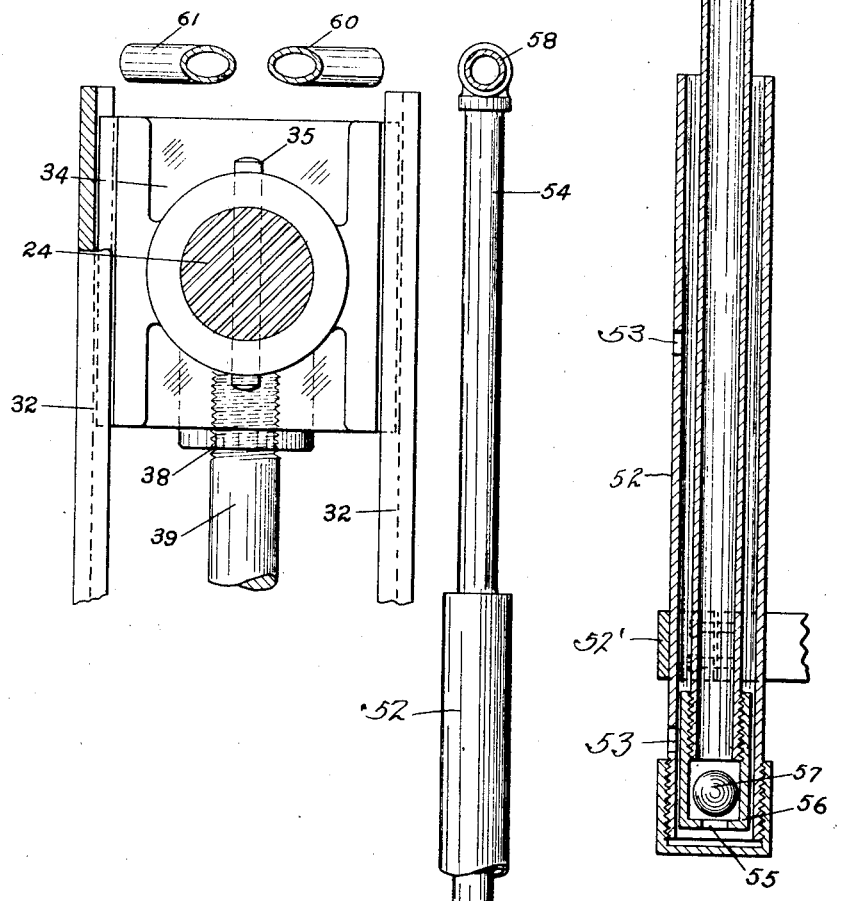
INVENTOR
PHILIP A. MYERS.
BY
Toulmin + Toulmin
ATTORNEY Patented Dec. 19, 1933

1,939,861

UNITED STATES PATENT OFFICE 1,939,861

POWER HEAD

Philip A. Myers, Ashland, Ohio, assignor to The F. E. Myers and Bro. Co., Ashland, Ohio, a corporation of Ohio Original application August 19, 1929, Serial No. 387,040, now Patent No. 1,816,191. Divided and this application March 7, 1930. Serial No. 433,890

10 Claims. (Cl. 184—4)

My invention relates to power heads.

It is the object of my invention to provide a power head that is completely self lubricated of simple and rigid construction, applying a direct thrust to the piston rod of the pump and particularly adapted for a double acting pump because of the uniformity of the application of the power in both directions.

It is my object to provide a power head in which the guiding mechanism to impart vertical reciprocatory movement to the piston of the pump from the rotary movement of the power head will be self lubricated, but so arranged that such lubricant cannot splash into the pump and contaminate the water.

It is a further object to provide a stuffing box or plunger cylinder between the well tube, the piston rod and the power head to provide for a perfect seal, easy replacement and quick accessibility.

It is a further object to provide a flywheel construction in the power head to give uniformity of movement, smoothness of operation and to eliminate excess gearing and at the same time to provide a crank for proper alignment and movement of the power transmitting mechanism.

It is an object to provide a rectangular connecting link and a pair of parallel bearing shafts by which an equidistant distribution of the power, the thrusts and the strains is accomplished, and by distributing the load in this manner, the minimum of size and weight of parts is required.

It is a further object to provide not only a splash but a force feed lubrication system and a system of long bearings lubricated so as to insure long life and self-contained action on the part of the pump whereby it will require the minimum of attention.

It is a further object to provide means for guiding the piston rod of the pump and the power head mechanism one with respect to the other by a single cross head against movement in four directions so that perfect alignment will result.

This application is a division of my copending application, Ser. No. 387,040, filed August 19, 1929.

Referring to the drawings:

Figure 4 is a section on the line 4—4 of Figure 3;

Figure 5 is a section on the line 5—5 of Figure 2.

Figure 1:
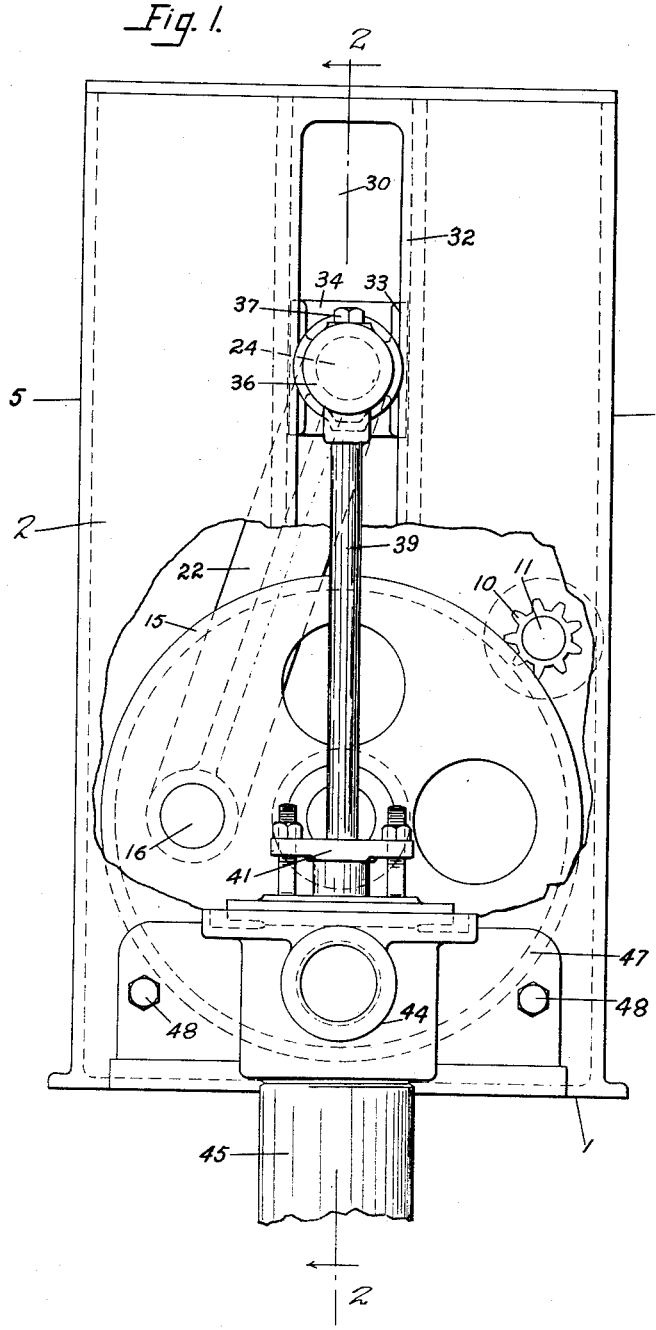
Figure 1 is an end elevation with the removable housing partially broken away.
Figure 2:
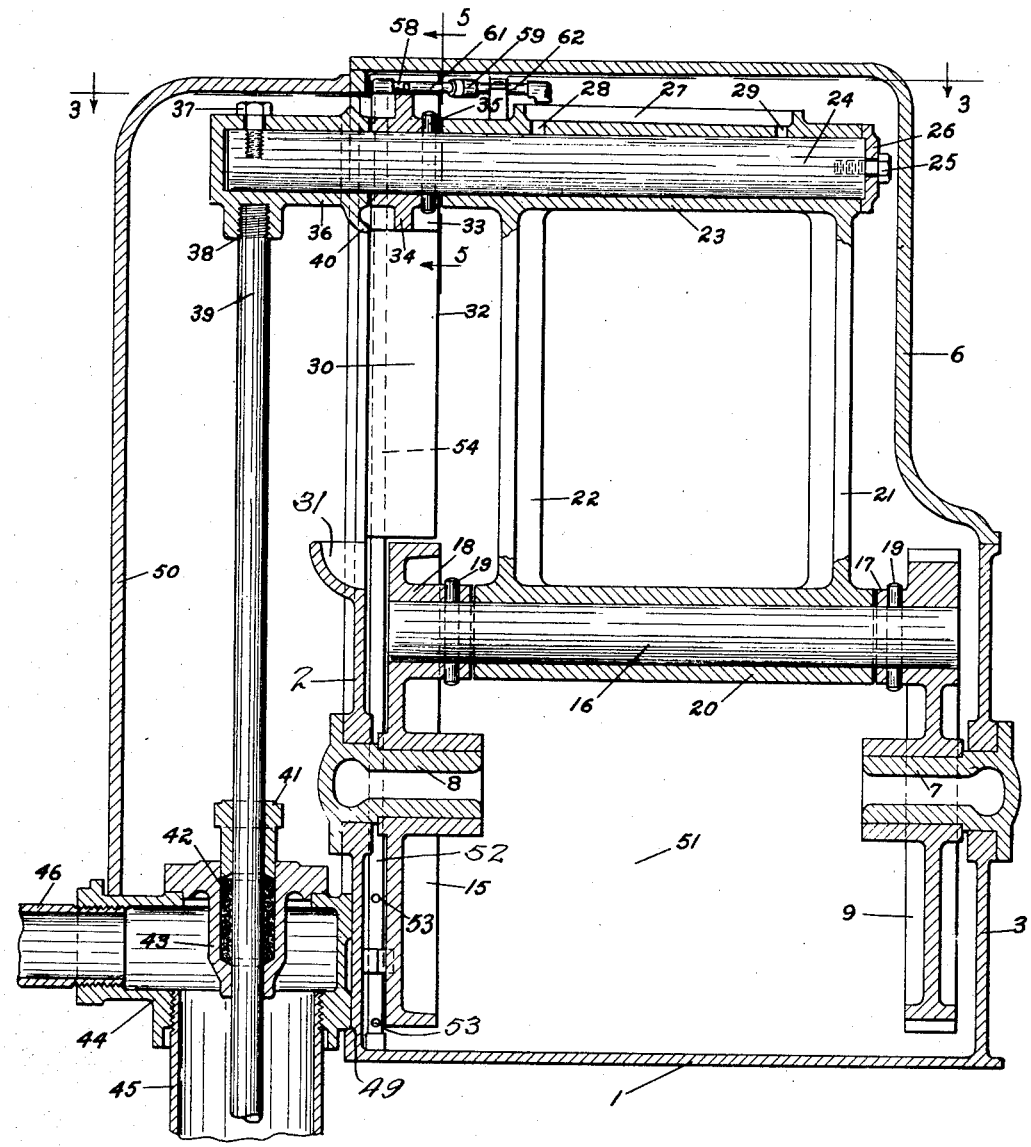
Figure 2 is a section on the line 2—2 of Figure 1.
Figure 3:
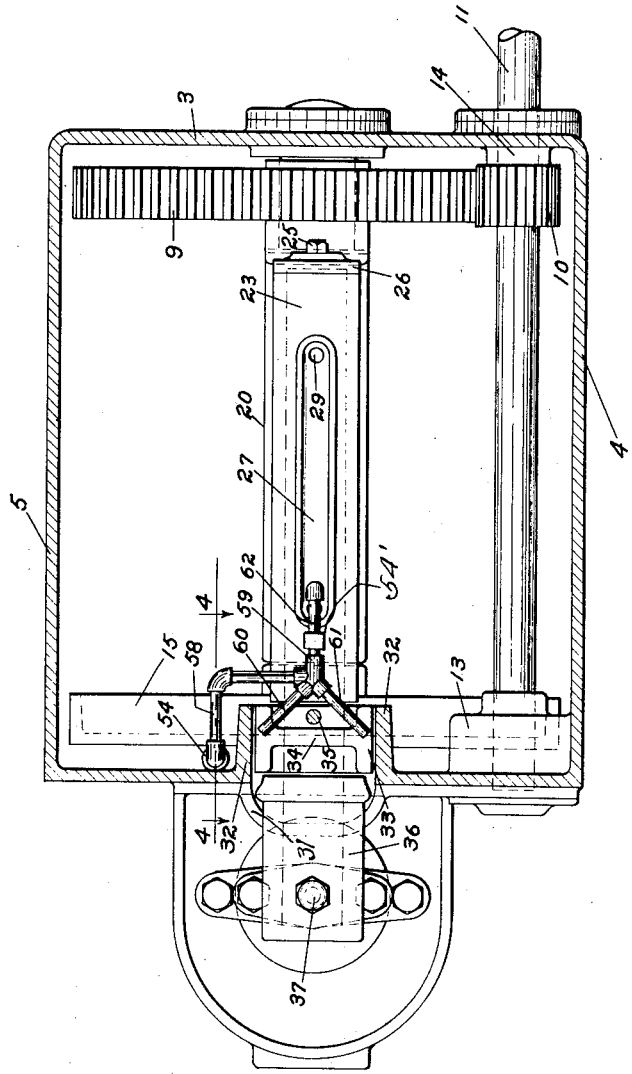
Figure 3 is a section on the line 3—3 of Figure 2.

Referring to the drawings in detail, 1 is the bottom of a casing having a forward wall towards the pump marked 2, a rear wall 3 and side walls 4 and 5. It is provided with a detachable cover 6.

In the front and rear walls 2 and 3 are mounted hollow stub shafts 7 and 8. On the shaft 7 is mounted the gear 9 which is driven by the pinion 10 from the power shaft 11 that is journaled in the front and rear walls of the casing as at 13 and 14. This power shaft extends outside of the casing and is driven by any suitable source of motive power.

The other stub shaft 8 carries a flywheel disk 15. Mounted on this flywheel disk and on the gear 9 and connecting them together is a transverse bearing shaft 16 mounted in sleeves 17 and 18 of the gear 9 and flywheel 15 respectively and pinned thereto by the pins 19. Between these sleeves and mounted upon the bearing shaft 16 is an elongated bearing sleeve 20 of a rectangular pitman which is composed of the spaced arms 21 and 22 mounted on the sleeve 20 and connected at their upper ends by a similar sleeve 23 which carries the bearing shaft 24. This bearing shaft has on one end thereof the detachable screw 25 carrying the retaining plate 26 that engages the end of the bearing sleeve 23. The top of this sleeve 23 is provided with a channel 27 for the distribution of lubricant to the ports 28 and 29 so that the lubricant can have access to the interior of the sleeve 23 and the shaft 24. The method of distributing this liquid to this channel 27 is described hereinafter.

The shaft 24 projects out of the main casing through a slot 30 in the front wall 2 of the main casing. The bottom of this slot is provided with an outwardly extending drain lip 31 for draining any lubricant back into the main casing which may drip from the side walls of the slot which are grooved at 32 for receiving the sides 33 of the cross head 34 that is pinned to the shaft 24 by the pin 35. This cross head is guided by the side walls 32 of the slot 30 in a vertical path. The extension of the shaft 24 through the cross head carries a sleeve 36 which is pinned to the shaft 24 by the set screw 37. This sleeve has threaded into it at 38, the upper end of the piston rod 39. The sleeve is also provided with a deflector lip 40 for deflecting lubricant from the cross head slide back into the main casing where the lubricant is contained. The piston rod 39 passes through a packing gland 41 and a packing 42 contained in the packing sleeve 43 that is supported on the top of the L-shaped fitting 44 that is threaded upon the well tube 45 at the top thereof. The side of this fitting is threaded to the delivery pipe 46. This fitting is provided with a pair of laterally extending flanges 47 which are bolted by the bolts 48 to the front of the casing. The lower sides of these flanges 47 rest upon the shoulder 49 of the casing.

The piston rod at its upper end and the extended end of the shaft 24 are enclosed by a detachable housing 50.

It will be understood that lubricant is contained in a pool for splash lubrication as at 51 and it also has a supply of lubricant for forced lubrication through the delivery pump hereinafter described.

This delivery pump consists of a stationary tube 52 having inlet apertures 53 through which lubricant is drawn from the pool 51 by the suction of the pump plunger 54 which reciprocates within the tube. This pump plunger 54 has a hollow tube having an aperture 55 at the bottom formed by a threaded closure member 56. This aperture 55 is adapted to be closed on the upstroke by a loose ball 57. This serves to deliver lubricant in a stream through the horizontal L-pipe 58 to the four-way fitting 59 which has two branches 60 and 61 delivering lubricant to the cross head slides while the other branch 62 delivers lubricant to the channel 27. The stationary tube 52 is attached by some suitable means such as a loop 52' to the front wall 2 of the casing. The movable part 54 of the pump is attached to some part of the pitman head so that as the pitman moves up and down the pump will operate. This attachment is effected by means of a loop 54'. The reciprocating piston of the lubricating pump is attached to and operated through the sleeve by means of an attaching strap 54'.

Thus, the splash and force feed lubrication is supplied from a common pool which is formed by the housing that also serves both as the support for the gearing and pitman mechanism and acts as the cross head guide for the cross head slide.

It will be understood that I desire to comprehend within my invention such modifications as may be necessary to adapt it to varying conditions and uses.

Having thus fully described my invention, what I claim as new and desire to secure by Letters Patent, is:

1. In combination, a casing adapted to contain a pool of lubricant, means to move a longitudinally disposed shaft through said lubricant in a circular path, a pitman having a sleeve with a lubricant channel therein mounted on said shaft, means on the casing for guiding said pitman in a vertical path above said lubricant, and means operated by the pitman for forcing lubricant from said pool to the channel and to the top of said pitman to the means on the casing for guiding said pitman.

2. In combination, a casing having a slot therein, rotating driving mechanism therein carried on either wall of said casing, a shaft connected to said driving mechanism rotating in said casing, a pitman having a sleeve with a lubricant channel therein rotatably mounted on said shaft between said walls, means on said casing adjacent the slot therein for guiding the upper end of said pitman comprising a cross head on said shaft, and guiding surfaces on said casing, and a lubricant pump carried by said pitman for delivering lubricant from the bottom of the casing to the channel and to said cross head and cross head guides.

3. In combination, a casing having a slot therein, rotating driving mechanism therein carried on either wall of said casing, means for connecting said driving mechanism rotating in said casing, a pitman rotatably mounted thereon between said walls, means on said casing adjacent the slot therein for guiding the upper end of said pitman comprising a cross head on said shaft, and guiding surfaces on said casing, and a lubricant pump carried by said pitman for delivering lubricant from the bottom of the casing to the upper end of said pitman to said cross head and cross head guides, means adjacent the bottom of said cross head guides for deflecting lubricant back into the casing.

4. In combination, a casing having a slot therein, rotating driving mechanism therein carried on each wall of said casing, means for connecting said driving mechanism rotating in said casing, a pitman having a sleeve with a channel therein rotatably mounted thereon between said walls, means on said casing adjacent the slot therein for guiding the upper end of said pitman comprising a cross head on said shaft, and guiding surfaces on said casing, and means on the pitman for forcing a lubricant from the bottom of the casing to the channel and to said cross head and cross head guides, means adjacent the bottom of said cross head guides for deflecting lubricant back into the casing, a piston rod carried on the outside of said cross head by said pitman, and means associated with the piston rod for deflecting lubricant adjacent the cross head back into said casing.

5. In a power head, a casing, driving mechanism therein, a pitman driven thereby, a cross head carried by said pitman, cross head guides formed by spaced walls surrounding a slot in the upper portion of said casing, and a force feed pump comprising a pair of telescoping pipes attached to said pitman for delivering lubricant from the bottom of the casing, one of said pipes having a plurality of branches above the pitman, two of which supply lubricant to the cross head and cross head guides and the other to the top of the pitman.

6. In a power head, a casing, driving mechanism therein, a pitman driven thereby, a cross head carried by said pitman, cross head guides formed by spaced walls surrounding a slot in the upper portion of said casing, and a force feed pump comprising a pair of telescoping pipes attached to said pitman for delivering lubricant from the bottom of the casing, one of said pipes having a plurality of branches above the pitman, two of which supply lubricant to the cross head and cross head guides and the other to the top of the pitman, a shaft in the top of the pitman connecting the pitman and the cross head.

7. In combination, a casing, rotating driving mechanism therein, a reciprocating pitman, a horizontally disposed shaft carried on the upper end thereof rotatably, a non-rotatable cross head mounted thereon, cross head guides formed on the upper portion of said casing, means for attaching a piston rod to the outer end of said shaft, a pump carried by said pitman adapted to deliver lubricant to said cross head and to the pitman where the shaft is rotatably mounted therein, and means on the upper end of said pitman for delivering lubricant from the pump to various points along the shaft.

8. In combination, a casing adapted to contain a lubricant, driving means in the casing, a reciprocating pitman in the casing operated by the driving means, said pitman having thereon a sleeve with a lubricant channel and a crosshead, and a pump means in the casing consisting of a pair of telescoping pipes, one of which is attached to and reciprocated by the reciprocating pitman and has attached thereto a branch to the channel and a branch to each side of the crosshead.

9. In combination, a casing adapted to contain a lubricant, driving means supported by the casing, a reciprocating pitman operated by the driving means, and a pump means consisting of a pair of telescoping pipes, one of which is stationary and communicates with the interior of the casing and the other of which is attached to the reciprocating pitman for reciprocation in the stationary one and having attached thereto a passageway fitting having three branch pipes thereon, whereby lubricant is discharged from the casing through the pipes.

10. In combination, a casing adapted to contain a lubricant, driving means supported by the casing, a reciprocating member comprising a sleeve having a lubricant channel therein and a guide head operated by the driving means, and a pump means comprising a pair of telescoping pipes, one of which is stationary and communicates with the interior of the casing and the other of which is attached to the reciprocating member for reciprocation in the stationary one and consists of a hollow reciprocating plunger having thereon a pipe extending to the lubricant channel and a pipe to each side of the guide head, whereby lubricant is delivered through the pipes to the channel.

PHILIP A. MYERS.